May 30, 1944.  C. A. H. MULDER  2,349,981
EPICYCLIC GEAR
Filed Sept. 6, 1939  6 Sheets-Sheet 1
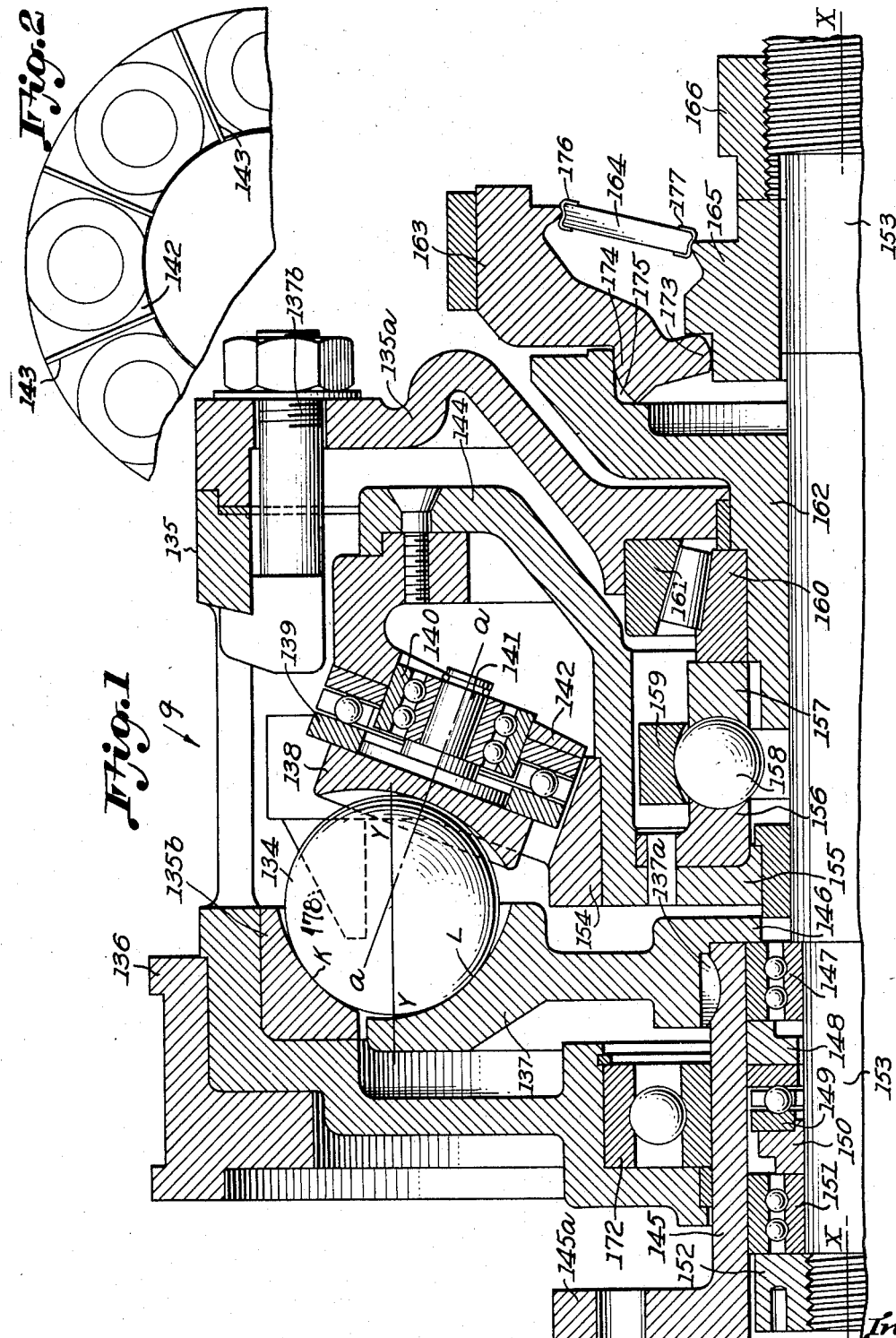
Inventor:
C.A.H. MULDER
By 
Attorney.

May 30, 1944.  C. A. H. MULDER  2,349,981
EPICYCLIC GEAR
Filed Sept. 6, 1939  6 Sheets-Sheet 2
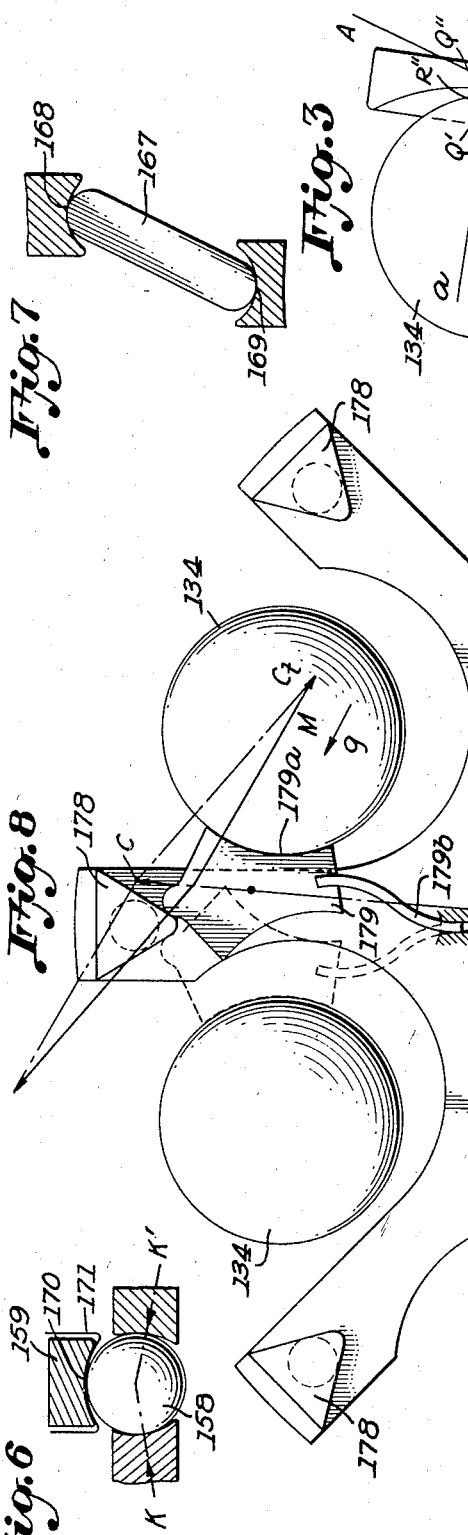
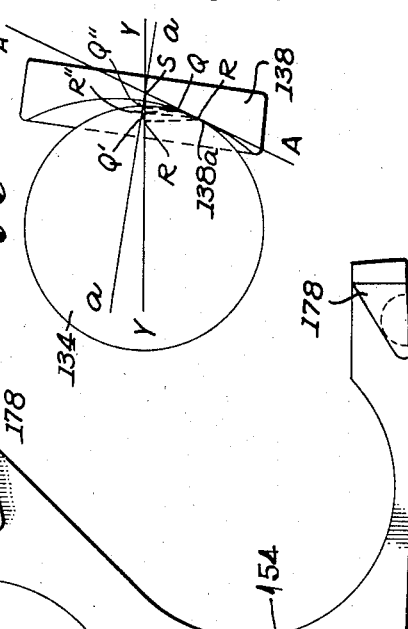
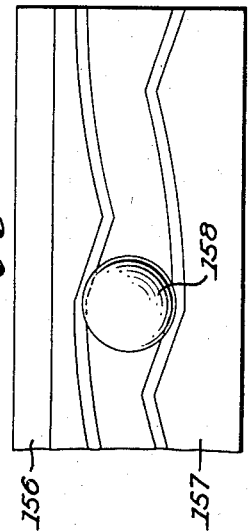
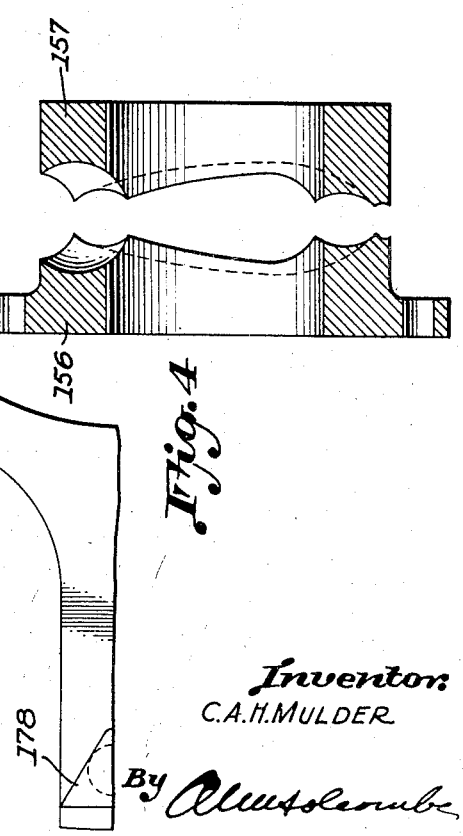
Inventor:
C. A. H. MULDER
By Alusslanbe
Attorney.

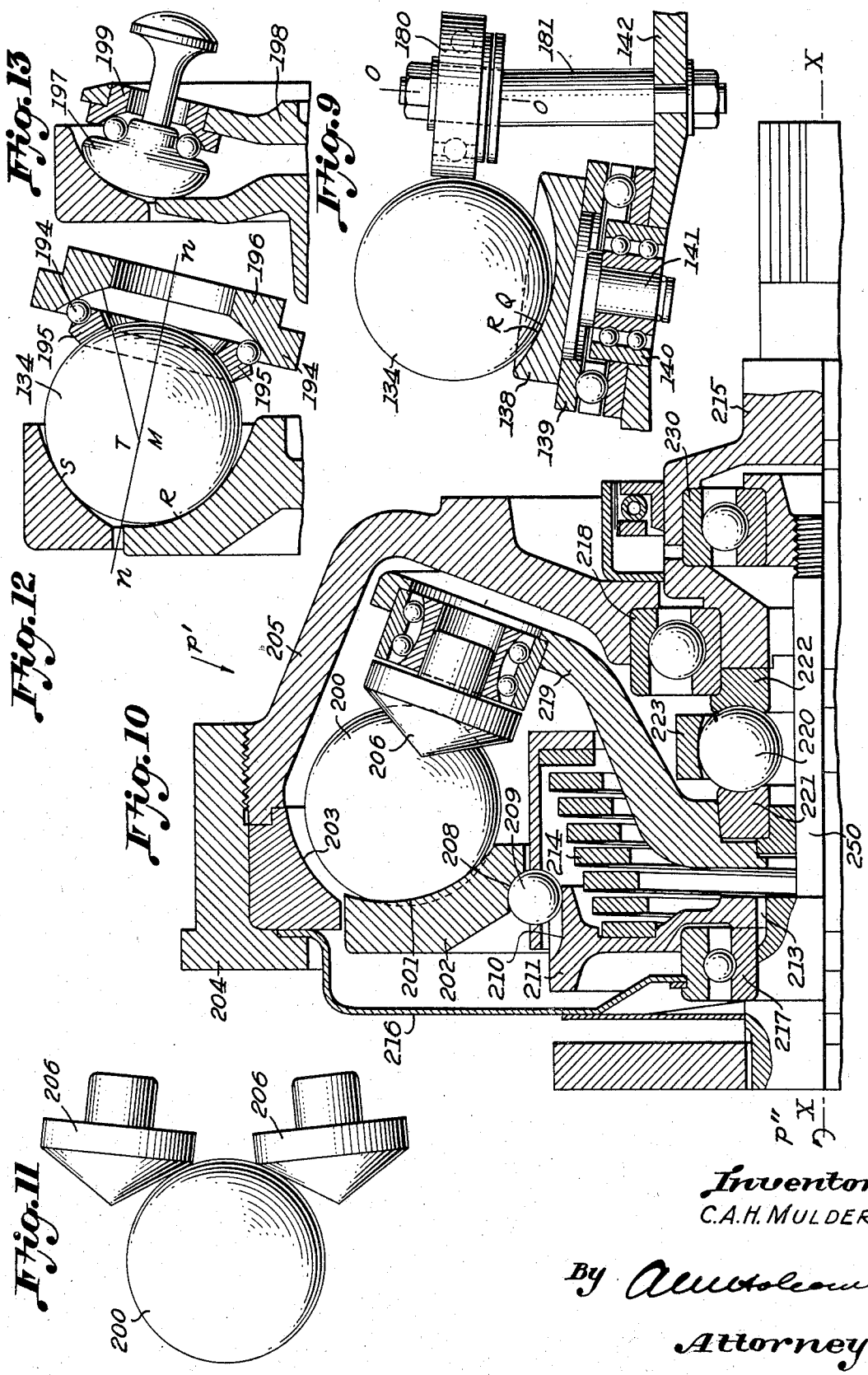

May 30, 1944. C. A. H. MULDER 2,349,981
EPICYCLIC GEAR
Filed Sept. 6, 1939 6 Sheets-Sheet 4

Inventor
C. A. H. MULDER

By *Attorney*

May 30, 1944.  C. A. H. MULDER  2,349,981
EPICYCLIC GEAR
Filed Sept. 6, 1939  6 Sheets-Sheet 5
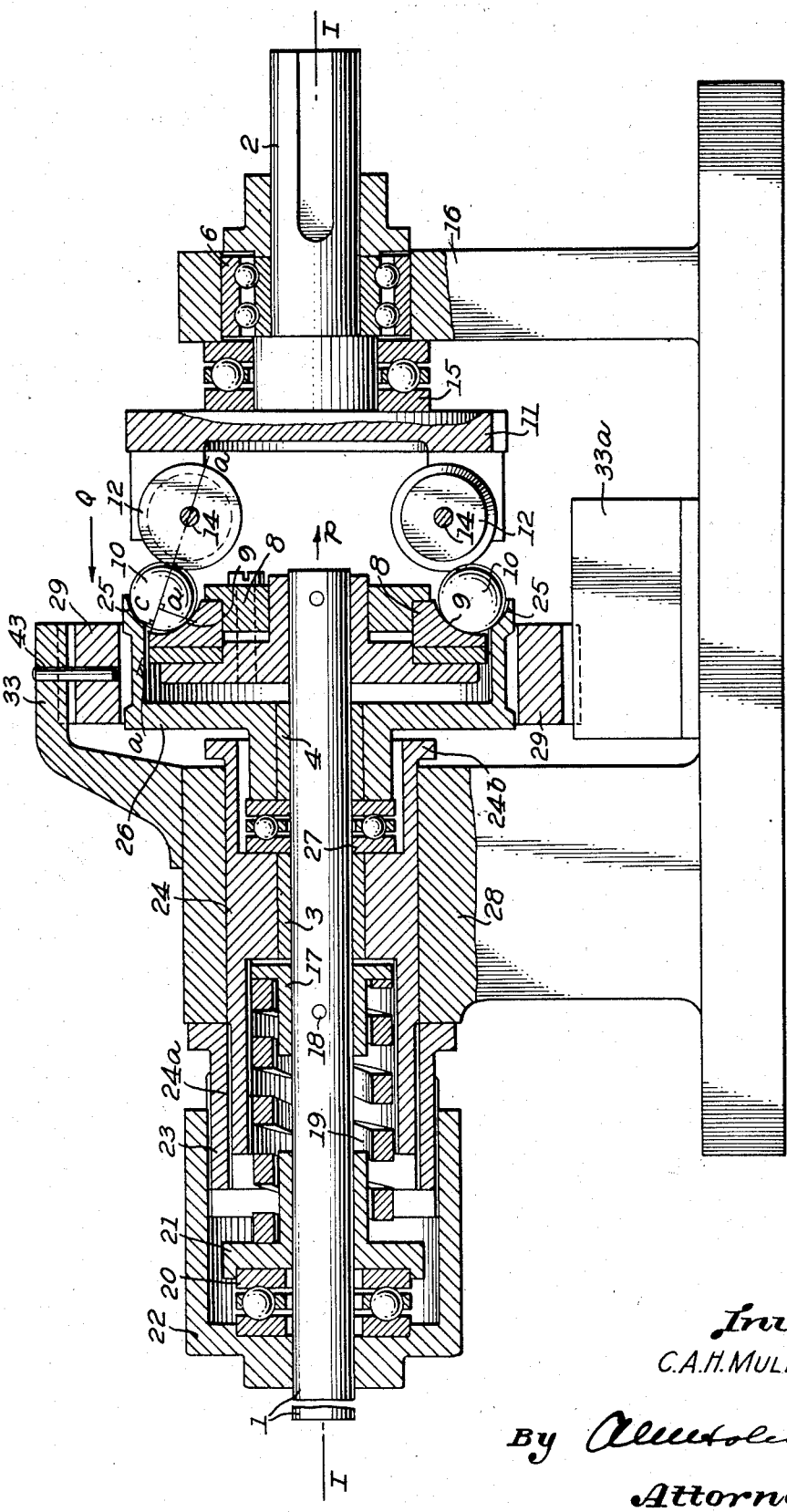
Inventor:
C.A.H. MULDER
By Allen Holcombe
Attorney.

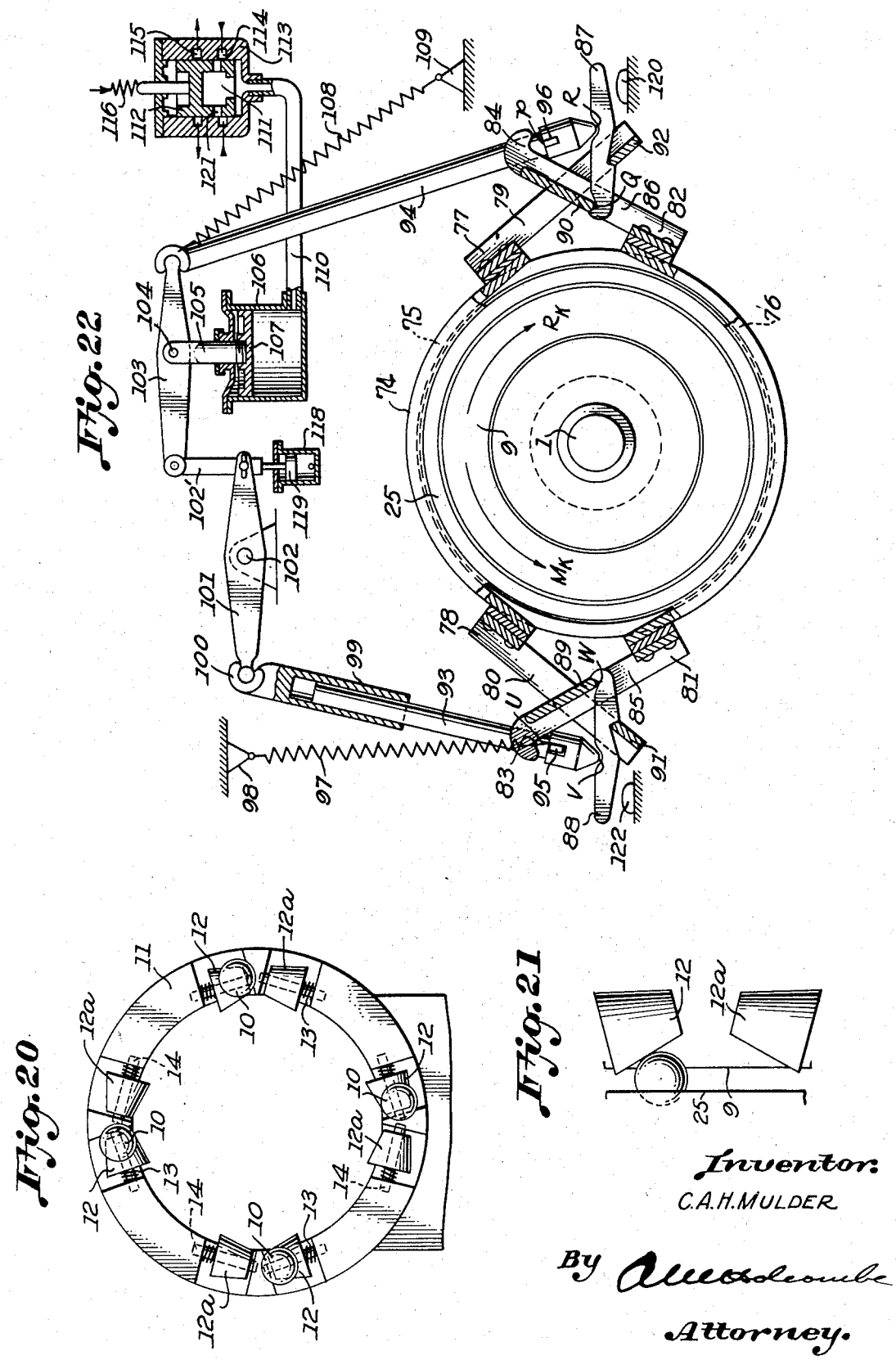

Patented May 30, 1944

2,349,981

UNITED STATES PATENT OFFICE 2,349,981

EPICYCLIC GEAR

Cornelis Andries Heero Mulder, Utrecht, Netherlands; vested in the Alien Property Custodian Application September 6, 1939, Serial No. 293,631
In the Netherlands September 15, 1938

18 Claims. (Cl. 74—281)

My present invention relates to a gear system in which round intermediate bodies serve to transmit the power. These round bodies fulfill their function by cooperating in rolling manner with co-axial races mounted on two separate but cooperating bodies. Additionally the round intermediate bodies are so guided with respect to a third, cooperating body, that their axes of rotation make no rotary movement with respect thereto.

My invention finds a complete field of utilization in a gear system particularly adapted for use in a motor vehicle, and which gear system is provided with automatic adjustment of its gear ratio.

According to my present invention, the said round intermediate bodies are subjected to slight relative movement by means of one or more of what I term screw or helicoidal bearings. These said bearings are separate from both the intermediate bodies and the cooperating bodies. Dependent of the torques transmitted by them, these bearings insure the axial transmission of power between the said three cooperating bodies.

Where, in this disclosure, I use the term screw-bearing, I intend to designate a device containing elements which make a somewhat screw-like or helicoidal movement with respect to each other.

In one embodiment the said intermediate bodies are so positioned with respect to said third cooperating body that their axes of rotation, about which they rotate, intersect the axis of the co-axial races. It will be recalled that the said races are provided in the two first-mentioned cooperating bodies. Since the axis of the said co-axial races is the axis of the main or drive shaft of the system, this means that the axes of rotation of the said intermediate bodies intersect the main axis of the gear system.

My invention contemplates accompanying a variation of the gear ratio by an axial displacement of the co-axial surfaces of the first two cooperating bodies with respect to each other.

It is further within the contemplation of my invention that each said intermediate body, which may be round, is in rolling contact with the surfaces of rotation of one or two members connected rotatably with said third body. If desired this rotatable connection may be self-adjustable.

A further embodiment of my invention is directed to the provision of rows of balls, one row for each said intermediate body, against which said intermediate bodies bear. In turn, each said row of balls bears in a race, which is connected with said third body.

According to my invention, I provide between the said three cooperating bodies, suitable means for permitting and bringing about an axial displacement of at least one of said bodies with either one or both of the other said bodies. Said means comprise, according to my invention, one or more elastic or resilient members, screw-bearings, or a centrifugal-governor; or any combination of one or more of the said devices may be employed to this end.

Finally, the said intermediate bodies may themselves serve as weights. In this embodiment, the centrifugal action of the said intermediate bodies influences the gear-ratio. This automatically adjusts itself under the control of such centrifugal action.

The afore-mentioned features, more particularly the means for producing axial displacement of the two co-axially arranged cooperating bodies, are of importance in the automatic regulation of the gear ratio of the system according to my invention. An important feature of the invention may be noted as residing in the determination of the said gear ratio by the relative position of the several elements of the assembly with respect to each other, more particularly the relative positions of the intermediate bodies with respect to the three said cooperating bodies. The positions of these said bodies are in turn, dependent upon external forces operating in opposite directions thereupon, which said forces increase in such manner with respect: (1) to the torque exerted by the driving or driven shaft (the primary or secondary shaft), and at the same time with respect: (2) to the number of revolutions, or more accurately R. P. M. of one of these said shafts, that efficient regulation of the gear ratio is obtained.

While in the foregoing, the application of my invention to several practical embodiments has been described, which embodiments will be described more fully hereinafter, it is apparent that the underlying feature of the invention which has been described in the immediate foregoing, can be applied to any other embodiment without departing from the spirit of the said invention.

The adjustment of the gear ratio in accordance with the position of the controlling elements may, within the province of my invention, take place either directly or through the intermediary of a suitable servomotor.

It will thus be seen that primary and/or secondary couples of force are employed for controlling the relative positions of the intermediate and cooperating bodies. Such a couple may for an example be produced by the momentary positioning of a member governing the power supplied by the driving engine, such for instance as the gas pedal of a motor vehicle. Alternatively, the control means may be a member, the position of which is influenced by the power of the driving engine, for example the position of a pressure indicator in the vacuum line or exhaust manifold, or perhaps the position of the resiliently suspended motor with respect to the frame of the vehicle. As a further possibility, the couple may be produced by the position of a member responsive to an axial force, such as is produced in a gear assembly according to my prior United States Patent 1,897,436, for example, wherein force is produced as a result of the converging arrangement of the surfaces with which the intermediate bodies cooperate. Finally, as a last illustration of the many possible methods of producing the desired couple, this may result from the position of a member controlled as to its own position by an axial force exerted by a screw-bearing of the general type which will be described hereinafter.

In the application of my invention to motor vehicles, I have started from the premise that it is apparent that it is desirable to avoid noises, wear and tear, the development of heat and the loss of energy, in so far as it is possible to do so. I realize that by consequence, it is desirable to employ direct drive at all moderate and high speeds, unless some extraneous cause, such as the slope of the road or the degree of the acceleration make it necessary to employ reduced gear-ratio. It follows from this that in the direct drive at any moderate or high speed, it is desirable to transmit a couple which is at least large enough to overcome the resistance of the road and the air resistance, on a road which is either horizontal or has a slight slope. Now, this road resistance is found to be practically independent of the velocity. On the other hand, the air resistance is about proportional to the square of that velocity. Thus, the couple of forces necessary to drive with uniform speed on a road which is either horizontal or has a slight slope, is to be considered as a value compounded of a constant plus a variable which increases as the square of the instantaneous speed, which may be measured, for example by the R. P. M. of the secondary shaft. For producing this variable, efficient use is made according to my invention of centrifugal-action or oil-pressure. This oil-pressure may, for example, be derived from the action of a gear pump. Both these are proportional to the square of the number of revolutions of the shaft under discussion. For producing the constant corresponding to road resistance which goes to make up the said value, it is possible to employ suitable means such as spring tension, for initially loading the system. Such spring means, if desired, may be adjustable according to the load on or the weight of the vehicle. It of course will be apparent that the centrifugal-action or oil-pressure control for the primary or secondary number of revolutions can be derived from, and the resulting couple of forces can be measured from, either the driving or the driven shaft, or any such suitable shaft derived therefrom. Additionally, in lieu of centrifugal action or oil-pressure, further sources can be employed as an indicia of the primary or secondary R. P. M., such for example as an electric motor or similar electrically-responsive device.

A simple embodiment of one part of my invention (which however, possesses inherent disadvantages), is obtained by utilizing the constructions according to Figures 21 and 22, and Figures 24 and 25 of my said prior patent, and to Figure 1 of my co-pending United States application, Serial No. 219,807 (Patent No. 2,315,486). These figures have now been incorporated in the drawings of the present application as Figures 14 through 18 inclusive. Referring now to Figures 14 through 17 of the present drawings, corresponding to Figures 21, 22, 24 and 25 of my said prior patent, the spring 47 shown therein, to the end of accomplishing the purpose of my invention, is so dimensioned and is given such bias that it serves, in conjunction with the centrifugal-action of the balls 40, and with the axial force excited by the primary couple resulting from the converging surfaces 63 (Figure 15) or 65 (Figure 16), to produce a desired interrelation or interdependence between the primary couple, on the one hand, the secondary R. P. M., on the other hand, and the gear-ratio. Similarly, having reference to Figure 18, corresponding to Figure 1 of my said co-pending application, the spring 19 therein is so dimensioned and so biased that its action, in conjunction with the centrifugal balls 10 cooperating therewith, and with the axial forces exerted by the primary couple resulting from the converging adjustment of the rollers 12, produce a desired interdependence and interrelation between the primary couple, the secondary R. P. M., and the gear-ratio. It is of course apparent that the proper choice of the shapes of the profile of the several elements cooperating with the balls or intermediate bodies, and the mutual positions of these elements relative to each other, has controlling influence on the said interdependence and interrelations.

Considering now the said figures in somewhat greater detail, it may be stated that the embodiment according to Figures 14 and 15 possesses the detraction that the balls 40 exert considerable sliding or rolling friction, or both, on surfaces 63 of the three cooperating bodies.

I can reduce this drawback considerably by constructing the surfaces of the said three bodies as rotatable cylinder mantles 65, as in Figures 16 and 17, or as cone-mantles 12, 12a, in Figures 18 through 21.

However, although it is true that this undesirable sliding friction can be appreciably reduced by recourse to the expedients illustrated in Figures 16 through 21, nevertheless spinning friction is not eliminated in those constructions. The intermediate bodies or balls still exert spinning friction against these mantle surfaces. This is because the point of intersection of the axes of rotation of a ball and the axis of its cooperating mantle surface lies at a point remote from the plane of contact of these two elements. This can readily be understood by reference to the drawings.

My new construction, as shown as Figure 1, removes this detrimental spinning friction.

The inertia and friction loading are prejudicial to smooth and stable regulation; and in the device according to Figure 1 tend to oppose the ready adjustment of the gear-ratio. These detrimental factors I am able to reduce by so constructing the gear assembly as to avoid the action of a separate centrifugal-governor such as may be required in the construction according to my said prior patent. In its stead, I may employ the centrifugal action of the round intermediate bodies or planets, which transmit the power from the primary race to the secondary shaft for serving as an indication, and to a certain extent, as a control, of the R. P. M. of the said secondary shaft.

In connection with the further and more complete description of my invention, and the embodiments illustrating features thereof, reference will be had to the accompanying drawings and the important constructional particulars illustrated therein. For further understanding of these embodiments, reference to my aforementioned prior United States Patent and pending United States application will be of value. In the drawings:

Figure 1 is a cross section taken through the upper part of one preferred embodiment according to my invention.

Figure 2 is a fragmentary elevation looking from the left of Figure 1, and illustrating the secondary head 142, that is, the body assembly or reaction assembly connected with the secondary shaft. For clarity, it may be stated at this time that the secondary shaft is normally the driven shaft, with which the balls or planets cooperate.

Figure 3 is a detailed elevation looking in the direction of the arrow $q$ in Figure 1 and showing the association of a planet with its corresponding clamping body.

Figures 4 through 7 show the details of construction of a screw-bearing of the type to which I have referred. Figure 4 is a top plan part, partly in section. looking down from the top of Figure 1. Figure 5 shows in development, the races in which the cooperating balls roll. Figure 6 is a detailed view showing with some precision, the details of the cooperation between the several elements of the so-called screw-bearing, while Figure 7 is directed to a modification of the construction shown in Figure 6.

In Figure 8 are shown in elevation but somewhat schematically, the construction according to Figure 1 for compensation for the centrifugal-forces acting on the planets.

Figure 9 illustrates a modified construction of the planets for the second and third bodies.

Figure 10 is a view similar to Figure 1, but illustrating a second embodiment of my invention.

Figure 11 is a top plan illustration of a detail of Figure 10, looking in the direction of the arrow P'.

Figures 12 and 13 are sectional views, respectively showing details of two other embodiments of a planet with its third cooperating surface.

Figure 14:
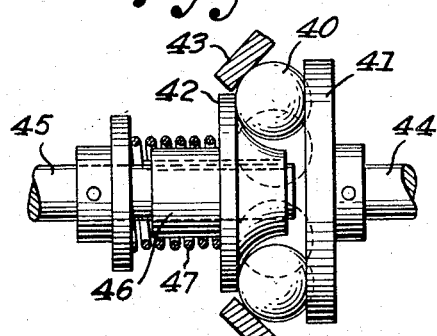
Figure 15:
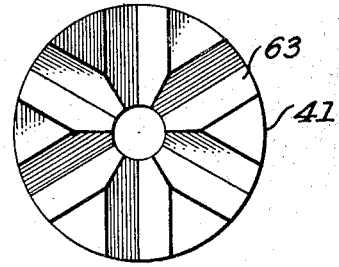
Figure 16:
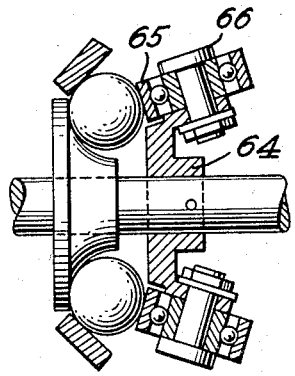
Figure 17:
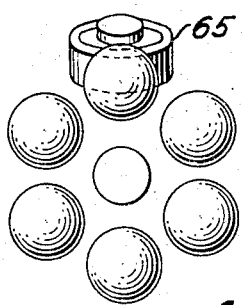

Figures 14 and 15 are side and front elevations, respectively, of a further modification, while Figures 16 and 17 are similarly a transverse section and a front elevation, respectively, of a further embodiment.

Figure 18 is a longitudinal section of a transmission employing certain features of my invention.

Figure 19:
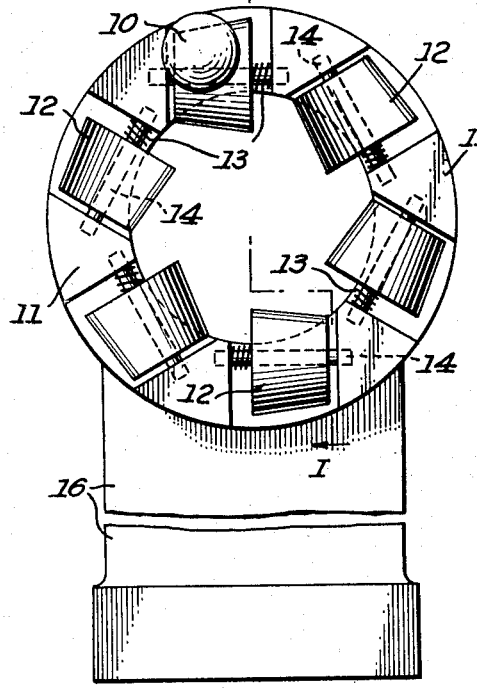
Figure 22A:
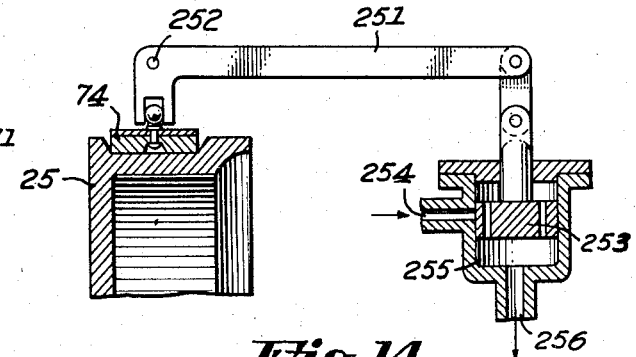

Figure 19 is an elevation viewed in the direction of the arrow P' in Figure 18. Figure 20 is a front elevation illustrating a method of reversing the direction in which the planets are driven, providing for braking by means of the motor, while Figure 21 is a schematic view showing in detail the arrangement of an intermediate body with reference to the surfaces of the three cooperating bodies, according to Figure 20. Figure 22 is an elevation of another embodiment of a coupling which under certain circumstances is free for rotating in either direction, while Figure 22a discloses a detail of that embodiment.

Turning now more particularly to Figure 1, each intermediate body, ball, or planet 134 cooperates with a reaction member 135 carrying a race 135b which is co-axial with the main axis $x$—$x$. This reaction member 135 carries a brake drum 136, for a purpose which will be described hereinafter. Additionally, each said ball cooperates with the race formed in a primary surface 137, keyed by means such as key 137a to the primary or driving shaft 145. This primary surface 137 provides the first of the two co-axial races, previously referred to, and is co-axial with the main axis $x$—$x$. Driving shaft 145 may be connected through flanges 145a with the motor or similar prime mover (not shown). Lastly, these planets 134 cooperate with and bear against secondary surfaces or third bodies 138. These secondary surfaces 138 are the third bodies to which reference has previously been made herein.

With the brake drum 136, a suitable brake or coupling is intended to cooperate, by means of which the gear housing and reaction member 135, and hence the race 135b, are braked or blocked when these are in their position corresponding to reduced gear-ratio of the transmission system. At the gear ratio 1:1, corresponding to direct drive, and while during operation of the motor (located to the left of Figure 1) while the latter is coupled with the flange 145a, and while any vehicle in which it is installed remains stationary, the action is such that the brake releases the reaction or secondary race 135b. The latter is then free to rotate with the planets, in a direction opposite to the direction of rotation of the motor.

Automatic operation of brakes and couplings for this purpose have been described in my said co-pending application Serial No. 219,089. Reference will be had at this time to present Figure 22, which is Figure 8 of the said application, for discussion of such construction.

In the construction shown therein couplings or braking means are depicted which are declutched when the gear ratio is 1:1 or when the engine is coupled with the driving shaft, so that the reaction member (second co-axial race) can rotate freely together with the planets. The reaction race is connected with the drum 74, which drum is surrounded by the brake band comprising diametrically opposed parts 75 and 76. At both ends of the part 75 pieces 77 and 78 of U-section are fixed, if desired, in an adjustable manner. This U-section is chosen because of its strength. Apertures 79 and 80 are formed in the parts 77 and 78 through which extend parts 81 and 82 of U-section which are connected to the ends of the band 76 (adjustably if desired) and which at their free ends, are provided with hooks 83 and 84. The cross section of the member 82 is also U-shaped. The members 81 and 82 are also provided with apertures 85 and 86 in which extend the ends of levers 88 and 87 which cooperate with edges 89 and 90 on the members 81 and 82 and with edges 91 and 92 on the members 78 and 77. The rounded conical ends of rods 93 and 94 are supported on the levers 88 and 87. In those ends, wedges 95 and 96 are provided which may cooperate with the hooks 83 and 84. Springs 97 engage the ends of the wedge 95 and are connected to a fixed support, for example, a fixed point in the frame of a motor car 98. The rod 93 can slide in the sleeve 99, which by means of a hook 100 engages a balance lever 101, which is rotatable about the fixed shaft 102. The other end of the lever 101 by means of the rod 102' is pivoted to a second balance lever 103, which is rotatable about the pivot 104 in a piston rod 105.

The rod 105 is connected to a piston 107, which may be reciprocated in a cylinder 106. The lever 103 is furthermore connected to the hooked end of a rod 94, which end is connected by a spring 108 to a stationary support 109. The cylinder is connected with a liquid (oil) supply conduit 110 and the space 111 below a piston 112 of a pressure-reducing device 113. The ring-shaped chamber 114 is connected with the pressure conduit of the oil pump of the motor. The annular chamber 115 is connected with an exhaust line which in an actual car leads for example to the oil tank in the crank casing. The piston 112 is under the action of a spring 116, so that the oil pressure beneath the piston depends on the force exerted by the spring.

The gas pedal (not shown) of an actual car would act on the spring 116. The oil pressure therefore also depends on the position of the gas pedal. The tension of the spring 116 thus determines the oil pressure.

This coupling means has the particular property that substantially only a pure couple is exerted on the drum 74, and that the drum is not forced eccentrically, so that this drum, together with the reaction race 25 in Figure 18 may be easily moved axially.

The utility of this is clear when it is considered that if in Figure 18 the shaft 8 is connected to an engine, the body 9 can not be adjusted in the direction of the axis I—I. Nor can the carrier 11 be displaced in this axial direction. Hence, in order to obtain the variable gear ratio which is obtained by the self-adjustment of the surfaces cooperating with the balls 10, it is the reaction race 25 which must be adjustable in the axial direction.

Now, this adjustability is easily possible with the drum 74, having the reaction race 25.

The axial adjustment of the drum 74 occurs when the transmission is set out of the direct drive position into a low-gear position and may also be used for example to control a lever 251 which can open a valve which admits oil under pressure into a cylinder 118 so as to lift the piston 119. Thus, when direct drive is obtained by shifting the drum 25, together with the brake band 75 to the left in Figure 22, then it will be seen that the lever 251, rotatable about the fixed pivot 252, and the piston 253 are so adjusted that oil under pressure from the pipe 254 can flow into the piston casing 255 and from there through aperture 256 to a pipe, which leads to the cylinder 118. This causes the brake bands 75 and 76 to be tightened on the drum 74, for, as a result, the left hand end of the lever 101 pushes the rod 99 down on to the top surface of the rod 93. The rod 93 is also lowered. Furthermore, the link 102' is raised and the rod 94 is pushed down through the lever 103. In this respect, it must be noted that the piston 107, due to the oil pressure, is pressed against the cover of the cylinder 106, so that the pivot 104 of the lever 103 becomes a point fixed in space. Due to the lowering of the rods 93 and 94, the levers 88 and 87, are moved in such manner that the bands are tightened.

This action is clarified by the following explanation:

Under the influence of the torque reaction $R_k$, the parts 75 and 76 of the brake band are dragged along clockwise. In so doing, when they reach the right in Figure 22, they must be considered as tightly connected to each other, due to the formation of the fixed triangle PQR. In this connection, it is to be noted that the member 80 exerts a force on lever 88, which force exceeds that which member 81 exerts on the said lever to such an extent that the latter moves in an upward direction and in so doing, pushes the rod 93 upwardly. When a further upward movement of this rod is prevented, the lever 88, under the influence of the forces acting thereon, is subjected to counter-clockwise rotation about the point V of the rod 93. This rotation causes the self-energization of the brake. By means of the links 93 and 94 and the levers 101 and 103, the brake torque is transmitted to the pivot 102 and the piston 107. Due to the oil pressure on this piston, the rod 93 exerts a downward force, and the rod 94 an upward force, on the levers 88 and 87, respectively. This action is possible, because the triangle PQR retains a fixed pattern under the influence of the forces acting on the system.

The operation of the coupling is as follows:

If the normal driving couple, for example that exerted by an internal combustion engine, as viewed from the driver's seat, acts in the direction of the arrow $M_k$, the torque reaction acts in the direction of the arrow $R_k$. During acceleration of the car, this torque reaction couple must be taken by the brake in order to hold the reaction member 74 against rotation.

The bands 75 and 76, due to friction, are dragged along by the reaction member 74. In other words, they are inclined to rotate in the direction of the arrow $R_k$. During this rotation, the hook 84 comes to rest on the wedge 86. Due to this fact, and to the clockwise movement of band 76, the triangles of rods PQR becomes rigid. The lever arm 88 is likewise so constructed, that the brake will tighten itself in an unlimited manner (self-excitement of the brake). The rod 93 is pushed upwards and urges the sleeve 99 and with it the left-hand end of the lever 101 upwards. Thus, the whole lever 103, the rod 94 and the lever 87 are urged downwards against the oil pressure under the piston 107. The possible rotation of the brake bands in the direction of the arrow $R_k$ is then limited by the stop 120 against which the lever 87 abuts and which may be resilient.

Now, when bands move in direction of arrow $R_k$, the rod 93 is forced upward. It would appear that part 81 would have to move counterclockwise to exert leverage on lever 88, for this to happen.

It will be clear that the forces in the rods 93 and 94 constitute a couple about the axis I and that almost no free reaction force occurs. This is due to the fact that the force in the rod 93 is transmitted to the rod 94 by the balances 101 and 103. The rate of increase of the brake couple can now be controlled by the pressure reducing device 113 in cooperation with the gas pedal. Thus by pressing the gas pedal and hence increasing the oil pressure in the cylinder 106, the described downward movement of the piston 107 in the cylinder 106 due to the tightening of the brake can be counteracted.

The pressure in the space 111 and the cylinder 106 is only dependent on the force exerted by the spring 116, said force being adjustable by the gas pedal.

When the piston 112 is lowered, oil from the chamber 114 can pass through the ports 121 in the piston into the chamber 111 and from there to the cylinder 106. The downward movement of the piston 107 is counteracted. Also when the piston 107 rises, no vacuum is produced in the cylinder 106 and chamber 111, but oil is supplied along the path described. Upon downward movement of the piston 107, however, the piston 112 is urged upwards according to the pressure of the spring 116 and oil can be exhausted from the cylinder 106 through the part 121 and the annular chamber 115. The piston 112 moves between the annular chambers 114 and 115.

The cylinder 106, piston 107 and device 113 serve to limit the maximum value of the couple to be transmitted, for if by means of pressure on the gas pedal, the piston 112 is lowered and consequently the piston 107 is urged upwards, the rod 93 exerts downward pressure on the lever 88 and through the rod 94 and equally great upward force on the lever 87.

If however, the reaction couple $R_k$ exceeds the limit defined by the oil pressure in cylinder 106, the piston 107 will move downwards, whereas the lever 88 goes up and the lever 87 goes down. When during this action the lever 87 hits the stop 120, the lever 88 no longer satisfies the conditions for self-excitement of the brake band and it starts slipping, the couple exerted by the brake keeping permanently the value defined by the oil pressure in the cylinder 106.

If the couple $R_k$ is reduced to zero, the bands are completely declutched, also under the influence of the resiliency of the brake bands. If the direction of the couple $R_k$ changes, as described above in general the hook 83 comes to rest on the wedge 95 and the triangle U—V—W becomes rigid. Then the piston 107 is drawn against the cover of the cylinder 106. The rod 93 telescopes in the sleeve 99. The brake couple is now taken by the springs 97 and 108 and cannot increase further than those springs allow, because the lever 88 finally can hit on the stop 122, due to which the brake starts slipping.

In this Figure 1 the secondary surface with which each ball 134 cooperates is constructed as a cup 138 rotatable about the axis $a$—$a$. Cup 138 bears against and is mounted in anti-friction manner against pressure bearing 139. Each cup 138 is provided with a shaft 141 depending from the underside of the cup, opposite to the cooperating ball 134, which shaft is supported in anti-friction manner by ball-bearing 140. The assembly of cup and bearings 138—141 has been mounted on a resilient part 142 of a cup-carrier 144.

A plurality of saw-cuts 143 (Figure 2) separate the resilient part of 142 of cup carrier 144 into a number of like parts which depend freely on the periphery of the working surface of the carrier 144. This resilient mounting of the cup 138 provides sufficient self-adjustability of the cup to distribute the load evenly over the planets or balls 134. In the geometrical treatment according to Figure 3, the ball 134 is shown in cooperation with the associated cup 138, looking in the direction of the arrow $q$ shown in the top center of Figure 1. It will be noted from Figure 3 that the axis $a$—$a$ of the cup 138 is at an angle with the principal axis $x$—$x$ the assembly (Figure 1). Stated another way, it will be seen that the rotational axis $a$—$a$ of cup 138 crosses the principal axis of the assembly.

However, it will be noted from Figure 3 that axis $a$—$a$ of cup 138 intersects the axis $y$—$y$ of ball 138 at point S. The shape of the concave cup surface 138 as well as the screw-like-surface of races 156, 157, between which latter I provide three balls 158 (Figures 1 and 4–7) have been chosen in such manner that the plane of tangency $a$—$a$ at the point of contact between ball 134 and cup 138 passes through the said point S. Properly speaking, this said point of contact is in reality a small area of contact, and has been so indicated in Figure 3, by the points R and Q. It is to be noted here that it is the cooperation between the races 156 and 157, and the intervening balls 158, which determines the equilibrium of the carrier 144. The fact that the tangent plane is shown as line A—A in Figure 3 passing through the point of intersection S means that within the contact region RQ of the ball 134 with cup 138, the ball 134 cooperates with the said cup in a manner somewhat analogous to the intermeshing of two conical toothed wheels. This may be expressed mathematically, having reference to Figure 3, by the equation $RR'/QQ'=RR''/QQ''$, where $RR'$, etc., represent lines perpendicular to the $y$—$y$ axis while $RR''$, etc., are perpendicular to axis $a$—$a$. In other words, this means that the small surfaces RQ can roll over each without slip and without spinning friction. If now, care be taken that upon variation of the gear ratio, that is to say, upon shifting the point of contact L of ball 134 with the surface of the primary race 137 and the point of contact K of the said ball with the surface of the race in the reaction member 135$b$, the pressures at the points of contact of the surface on each other are always maintained sufficiently large. If it further be insured that the requirements of the aforementioned proportionality equation are always complied with, then neither slip nor spinning friction can ever occur between the ball 134 and the cooperating cup 138.

These requirements can be readily satisfied according to my invention. I accomplish this by ensuring that upon changing the gear ratio the balls 134 are shifted, along with the cups 138, as a unit relative to the bearing surface of the primary race 137. By consequence, the secondary reaction member 135$b$ undergoes a relative axial displacement. This displacement is occasioned in part by the co-action of elements 156—159 inclusive of the screw-bearing illustrated in Figures 1 and 4–7 inclusive. As shown in Figures 4–7 inclusive, more particularly Figures 5 and 4, the three balls 158 forming part of this bearing run in the sloping paths of the cooperating races 156 and 157.

To compensate for slight differences or inequalities in the races 156 and 157 in which the three balls 158 are housed, as well as for any slight deviation from a co-axial condition of the races 156 and 157, the ring 159 will be found to adjust itself somewhat eccentrically. This eccentric adjustment of ring 159 may also be brought about by assymetrical loading of race 159. Balls 158 then begin to run on different radii. A slight difference may thus occur in their rotatory movement. This difference in movement may not always be eliminated upon the reversal of the direction of movement of the balls 158. Thus quite possibly one of the said balls may return somewhat earlier than the others (see Figure 5) to the deepest point of its path. Hence this leading ball has reached and passed through the deepest point in its channel (point of the lightest load) before the other two balls have reached their lowest point. After a number of such reversals have occurred, this difference assumes a somewhat swing-like acceleration, with increasing amplitude. Finally, undesired jamming occurs. The disastrous condition maintains that the desired equal distribution of forces over the three balls 158 does not exist. It is quite possible that this deviation of positioning and loading may become so large that one of the balls 158 becomes totally unloaded and rolls to the deepest point of its trough in race 157. If however, this happens when the part 156 is at a considerable angle from its lowest position, a large deviation occurs in the angles formed between the balls 158, and the radii of the cooperating races 156 and 157 (see Figure 6). Due to this action, the desired uniformity of the screwlike movement is disturbed.

I have avoided this undesirable action, in the embodiment undergoing discussion, by providing three small cavities of convex surface in the ring 159, for receiving the three cooperating balls 158. In Figure 6, for example, these cavities are provided at 170 in small, thin pieces of copper 171. The radii of curvature of these cavities are somewhat larger than those of the said balls 158. As a result, these balls, near their poles of rotation, lie in the said small cavities 170 and rotate therein during the screwing movement. Examination of Figures 4 and 5 will aid in understanding this action. By consequence, the angles between the radii of the cavities and the centers of said balls cannot assume any large deviation, say, of the order of 120°. At the same time, the desired light rolling contact previously referred to is ensured, inasmuch as the contact pressure of the balls against the small cavities 170 may be quite small.

It is to be noted at this point that the round balls 158 and sloping races 156, 157 may be replaced, if desired, by non-spherical bodies running in grooves which may be of circular cross-section. For example, in Figure 7, somewhat elliptical bodies 167 are received in grooves 168 and 169, against which the said bodies react.

For investigation and research work, this last described construction possesses certain advantages in that the shape of the bodies 167 can be varied more readily than can be the shape of the race surfaces of parts 156 and 157, the variation of which latter is much more time-consuming and expensive.

Secondary reaction-member 135, Figure 1, is connected by means such as lock-bolt 137b with disc 135a. This disc 135a is rotatable, by suitable means such as conical rolling-bearing 161—160, about sleeve 162 on the secondary shaft 153. A suitable ball-bearing 172 serves to support the other end of this reaction member 135. This second ball-bearing 172 is received about and is slidable along the principal shaft 145. Centrifugal weights 163 are loosely received between sleeve 162 and member 165. Member 165 is keyed to the secondary shaft 153. A bearing surface 173, formed as a sort of nub projecting from an inner end of each of the weights, 163, serves to associate the corresponding weight 163 pivotally with respect to member 165. Similarly, the curved end of bearing 174, also projecting from the same end of the centrifugal weights 163 but in a direction opposite the bearing surfaces 173, serves to cooperate with a recess 175 in sleeve 162 and supporting the centrifugal weight in a pivotal manner and with camming action between sleeve 162 and member 165. The opening 175 forms one side of a square-sectioned recess in sleeve 162.

A downwardly depending arm is formed near the free end of each weight 163. Similarly, an upwardly extending arm is formed near the outer end of member 165. Rubber blocks 164 extend between these arms and bear by edges 176 and 177 (these edges may be shielded if desired) against weights 163 and member 165, respectively. Reacting against these members, the blocks 164 tend to bias the weight 163 to the left in Figure 1.

Stated in other words, and preferably employing four of the said blocks 164, these rubber blocks tend to press the weights 163 upwardly in biased manner in Figure 1. In operation, this biasing force is increased by the centrifugal stresses exerted on weights 163. Axial forces acting in opposite directions are exerted on member 165 and sleeve 162, respectively, by lever arms or bearing surfaces 173 and 174.

Turning now briefly to a consideration of the principal shaft 145, hub 146 of the bearing surface or primary member 137 bears against a suitable ball thrust bearing 147. Primary shaft 145, preferably is formed as a hollow tube, and overlaps in spaced relation a part of the length of the secondary shaft 153. In the annular space thus formed are mounted a radial bearing 151 of the ball-bearing type, an axial pressure bearing 149, and spacing members 148, 150, along with a lock nut 152.

In this Figure 1, what may be termed as axial force circuits may be traced as follows: Beginning at ball 134, force is exerted against cup 138, bearing 139, resilient part 142, carrier 144, hub 155, race 156, race 157, bearing 160, sleeve 162, centrifugal weight 163, member 165, secondary shaft 153, bearing assembly 152—147, hub 146, primary surface 137, back to ball 134. A second force circuit may be traced from ball 134, cup 138, bearing 139, resilient part 142, carrier 144, hub 155, race 156, ball 158, race 157, bearing 160—161, disc 135a, reaction member 135, reaction race 135b and back to ball 134.

In this construction, I can compensate for the influence of the centrifugal forces acting on the balls 134 in simple manner.

Referring to Figures 1 and 8, I associate a member 154 with the cup carrier 144. This member 154, of spiderlike construction, terminates at its periphery in a number of fingers 178 adapted to seize between the balls 134. Pressure members 179 are provided on members 154, to engage loosely with fingers 178. They are mounted by means such as springs 179b on the member 154. Because of this loose mounting they are flung outwardly in Figure 8 by centrifugal forces, as indicated by arrow C in said figure. The springs 179b serve to restrain members 179 from falling inwardly out of their operable positions. Members 179 are provided with concave side walls and a projecting, convex end nub. These members are each pressed at their ends against the cooperating finger 178, preferably of inverted triangular shape with rounded apex directed toward the said nub, at one or the other of the sides of said finger. Each member engages, by said convex or cup-shaped part 179d, against one or the other of the adjacent balls 134. The component $C_t$ of centrifugal forces acting on pressure members 179 drives the balls 134 into their clamping position against the action of centrifugal forces acting on the said balls. Thus, when the motor is braked about drum 136 in a manner such for example as heretofore discussed with respect to the embodiment disclosed in Figure 22, and by consequence, the secondary shaft 153 serves temporarily as a driving member, the balls 134 are pushed in the opposite direction, as indicated by arrow g in Figure 8, into a new clamping position. It will be seen that cups 138 at all times cooperate in proper manner with balls 134. Upon such directional change taking place, the end nubs of pressure member 179 slip below and past the cooperating finger 178, into the dotted position shown in Figure 8, the corresponding position of spring 179b likewise being shown therein. Members 179 then serve to press the balls 134, against the centrifugal force acting thereon, into the clamping space between balls 134, members 179, races 135b and 137, and cup 138, corresponding to exertion of driving force through secondary shaft 153.

Turning now to the slight modification shown in Figure 9, it will be seen therefrom that the balls 134 are always pressed into the clamping spaces by means of counter rollers 180. These rollers may be self-adjustable, if desired. In this construction, additional means for compensating the centrifugal forces on the balls 134 are rendered unnecessary. As shown, each small roller 180 is mounted on a spindle 181. Resilient part 142 of cup carrier 144 carries this spindle.

Now, when the secondary shaft 153 serves as driving member, the counter rollers 180 permit the transmission of the secondary couple of forces to the balls 134 and thence to the primary shaft 145.

In this constructional embodiment it is not literally true that the centrifugal forces acting on the balls are compensated by a force excited in a direction opposite to that centrifugal force.

Advantage is taken of this fact in a further embodiment according to my invention. In this further embodiment, shown in Figure 10, I obtain the desired influence of the secondary R. P. M. on the couple of forces to be transmitted, without resort to the use of separate centrifugal weights.

Accordingly, in the construction shown in Figure 10, I omit the centrifugal weights or governor 163. The advantage is obtained thereby that I eliminate detrimental inertia and friction-action, which, should it occur during such time as the motor is being braked, might be improvidently compounded with the inertia reaction of the motor vehicle itself.

In this embodiment now to be described I prefer to employ 12 balls 200 in cooperation with race 201 of primary surface 202. These balls also cooperate with race 203 (co-axial with the first race) in the secondary reaction member. This race 203 is thus seen to be formed in housing 204, 205. Lastly, each said ball 200 cooperates with two adjacent ones of a series of rotatable cones 206. These are shown schematically on larger scale in Figure 11. The shafts of the cones 206 intersect the main axis $x$—$x$ of the assembly. The cones are housed in such manner in carrier 219 that between each two adjacent balls 200, there is a cone 206; that is to say, the balls 200 and cones 206 alternate. Primary surface 202 is formed with an annular disc-like periphery, on the inner or underside of which annulus is formed a race 208. This race 208 is part of a toroidal-surface, and cooperates with three balls 209. These balls are spaced at equal distances about the periphery, and run in three uniformly-shaped grooves 210 of a spiderlike body 211. Keys 213 serve to connect body 211 to driving shaft 250 for longitudinal movement relative thereto.

Balls 209, grooves 210 and race 208 serve to comprise a screw-bearing. When turning to the right, as seen from the left of Figure 10, this bearing exerts an axial force on primary surface 202, directed to the right in Figure 10.

A cage 212 serves to grip the balls 209. Small cups may be arranged in the holes provided in this cage. The shape of these cups with respect to the balls 209 may be such that between the surface of the ball and the cooperating cup, a good oil-film lubrication is obtained.

Flexible spring 214 is mounted between the cage 212 and spider 211, and being disposed coaxially about driving shaft 250, acts parallel to the screw-bearing 208—210. It exerts such a couple of forces on the cage 212 that the ball 209 is carried to the right into the position shown in Figure 10, whereby the points of contact of the balls 200 and primary surface 202 lie nearly on the axes of rotation of the said balls. These axes of rotation are the diameters which pass through the point of intersection of the axes of the cones 206 with the main axis $x$—$x$, when the assembly is in the position for direct drive.

The housing previously referred to comprises two parts, 204 and 205, preferably threaded together, and also comprises a resilient front or cover plate 216, bearing on reaction member 203. This plate 216 is initially tensioned, and tends to press the secondary reaction member 203 to the right, in Figure 10, into a position corresponding to a reduced gear ratio.

This housing 204, 205 is supported on ball-bearings 217, 218. It is thus free to rotate about the system axis $x$—$x$.

A brake or coupling means is disposed about the brake shoe 204, forming part of the said housing. By this means this shoe, while in the position corresponding to reduced ratio of transmission, may either be braked, or coupled with a stationary part, such for example as the frame of a motor vehicle. With 1:1 gear ratio corresponding to direct drive, and with idling operation of the motor while the latter is coupled to drive shaft 250, this brake (not shown) releases the housing, so that the latter is free to rotate with the planets.

Automatically operating constructions of brakes or couplings for this general purpose are known in the art, and have been described hereinbefore in connection with Figures 18 et seq. It will be seen that the cones 206 are rotatably carried on a somewhat resilient disc or carrier 219. This carrier may, if desired, be provided with saw-cuts, corresponding to cuts 143 in Figure 2, dividing the carrier into radially resilient parts. This tends towards an equal distribution of the load over all the balls or planets 200.

A screw bearing 220—223 is provided between the secondary or driven shaft 215 and the carrier 219. Axial thrust bearing 230 is mounted between primary shaft 250 and secondary shaft 215.

The said screw-bearing comprises three balls 220, races 221, 222 and ring or cage 223. Similarly to the construction shown in Figures 4—7, this screw-bearing possesses surfaces constituting parts of helicoidal surfaces having right and left hand pitch.

Dependent upon the requirements of regulation which the gear assembly must satisfy, these pitch angles are chosen in such manner that when the shaft 250 is driven by the motor (not shown) in a counter-clockwise direction as indicated by arrow P'', the ring 219 swings to the left of Figure 10 under the influence of the forces exerted thereon by the balls 200. Accordingly, cage 212 is pushed to the left with respect to spider-like body 211, and is adjusted relative thereto against the action of the spring 214. Balls 209 moving in the direction of the arrow P' transmit the adjusting force.

It will be seen that planets or balls 200 are pressed to the left in Figure 1 and towards the axis x—x, into a position of reduced gear ratio (ratio less than 1:1).

Due to the action of the grooves 210 and the balls 209, as well as to the co-action between the elements of screw-bearing 202—223, the balls or planets 200 are clamped between the surfaces of the primary surface 201, reaction member 203, and the third body or cones 206, in such manner that these balls cannot slip with respect to any of these surfaces.

Centrifugal force on the planets 200 tends to move these planets outwardly and to the right in Figure 10. Thus, this force tends to bring the transmission into direct drive position (gear-ratio 1:1) against the force resulting from the biasing of the carrier 219 by screw-bearing 220—223 under the influence of the drive shaft 250.

The shape and positioning of the surfaces of the three bodies 201, 203 and 206, as well as of groove 210, and races 221 and 222 of the two screw-bearings, the number and size of the balls, the characteristics of the spring 214, as well as of the resilient plate 216, all can be chosen in such manner that the transmission, both when the motor is driving or being driven, automatically adjusts itself at all times to an efficient gear ratio.

The initial tension of the front plate 216 is intended to displace the housing 204, 205 slightly to the right at such times when the balls 200 do not exert forces on the reaction member 203, the axial components of which exceed this initial tension.

This initial tension insures that when the secondary shaft 215 is at rest, at which time no centrifugal forces act on the balls 200, the transmission will assume a position of low gear ratio. Consequently the motor can idle without the exertion of the couple of forces which otherwise would be necessary to bring the device out of direct drive position.

As a possible refinement of my invention I may substitute for the cups 138 of Figures 1 and 9 or the cones 206 of Figures 10 and 11, together with their supports, a construction similar to that shown in Figure 12.

In that figure, balls 134 bear against spherical cups 196. A ring 195 and plurality of small balls 194 are interposed between each such ball and its cooperating cup. The cup 196 is fixed against rotation about its axis, and may be connected with the resilient part 142 or carrier 219, as the case may be. The center of curvature of this cup is located at the point T, disposed in such manner with respect to the center M of the ball 134, that the latter is free to move similarly to the first-described constructions, bodily towards and away from the main axis x—x. If desired these, small balls 194 can be adapted to cooperate directly with the ball 134, as by being received in an annular groove ground in the surface of the ball 134. Such construction would eliminate ring 195.

While in the foregoing embodiments the planet bodies have always been shown as balls, such construction is by no means indispensible. It is evident from Figure 13 that the several planets 197 are of mushroom shape, each said planet body cooperating by means of small balls with a cup 199 received in the third bodies of secondary head 198.

Obviously my invention is not limited to the foregoing embodiments. For example, it may be used either in its entirety or in part for other purposes, such for example as in aircraft, electric motors, machines for constructing tools, lifting machines, etc. Accordingly I intend that the scope of my invention be limited only by the attached claims.

What I claim is:

1. A gear transmission having automatically variable gear ratio, comprising a driving shaft; a driven shaft; a primary surface and a reaction member rotatable about said primary and secondary shafts, respectively, said primary surface and reaction member having cooperating, facing, and co-axial races therein, and said primary surface and reaction member being axially movable relative to each other; a third body associated with said primary surface and reaction member and adapted to be mounted on one of said shafts; a plurality of intermediate bodies disposed between and in contact with said primary surface, reaction member, and third body, so as to be in rolling contact with the two first-mentioned elements, and so as to rotate about their axes against said third body; torque-responsive means for moving said three elements axially relative to each other; weights responding to centrifugal force, depending upon the speed of one of said shafts, and moving said three elements axially relative to each other, the combination of the last two movements of the three said elements resulting in the determination of a gear ratio highly suited for the momentary load demand on the transmission, in the substantial absence of sliding and rolling friction of the intermediate bodies on the said three elements.

2. A gear transmission having automatically variable gear ratio, comprising a driving shaft; a driven shaft; a primary surface and a reaction member rotatable about said primary and secondary shafts, respectively, said primary surface and reaction member having cooperating, facing, and co-axial races therein, and said primary surface and reaction member being axially movable relative to each other; a third body associated with said primary surface and reaction member and adapted to be mounted on one of said shafts; a plurality of intermediate bodies disposed between and in contact with said primary surface, reaction member, and third body, so as to be in rolling contact with the two first-mentioned elements, and so as to rotate about their axes against said third body; torque-responsive means for moving said three elements axially relative to each other; and means responsive to the rotational speed of one of said shafts for moving said three elements axially relative to each other, the said last two movements of the three said elements tending to counterbalance each other and resulting in the determination of a gear ratio highly suited for the momentary load demand on the transmission, in the substantial absence of sliding and rolling friction of the intermediate bodies on the said three elements.

3. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with one or more surfaces associated with the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races, and means producing an axial force on a selected one of the said three bodies, whereby the intermediate members are clamped between said races and said surfaces, means for axially biasing the first said body in one direction, means for axially biasing the second body in the opposite direction, the two last-mentioned group of means operating selectively under certain load conditions to displace axially the three said bodies relative to each other to vary the gear ratio.

4. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating with one or more means mounted relatively rotatable on the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races; and means producing an axial force on a selected one of the said three bodies, whereby the intermediate members are clamped between said races and said means mounted relatively rotatable on the said third body.

5. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating with one or more resiliently carried surfaces associated with the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races; and means producing an axial force on a selected one of the said three bodies, whereby the intermediate members are clamped between said races and said resiliently carried surfaces.

6. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with a series of balls bearing in a race connected with the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races; and means producing an axial force on a selected one of the said three bodies, whereby the intermediate members are clamped between said races and said series of balls.

7. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with one or more surfaces associated with the third of the three said bodies, so as to rotate about their axes against the said third body; the axis of rotation of the intermediate members intersecting the axis of the said co-axial races, and upon variation of the gear ratio being subjected to displacements relative to the three said races, the said intermediate members being each of substantially continuous generally mushroom shape; and means producing an axial force on a selected one of the said three bodies, whereby the intermediate members are clamped between said races and said surfaces.

8. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with one or more surfaces associated with the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races; means producing an axial force on a selected one of the said three bodies, whereby the intermediate members are clamped between said races and said surfaces; and means for forcing said intermediate members against the action of centrifugal forces, acting on these members, into clamping engagement with the said races and the said surfaces.

9. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with one or more surfaces associated with the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races; a spider with cam-shaped fingers extending one between each said intermediate member; pressure members associated one with each said finger and having concave sidewalls adapted to engage about and to force the intermediate members into clamping relation with said races and said surfaces under the influence of centrifugal forces acting on the intermediate members, and torque - responsive means producing an axial force on a selected one of the said three bodies, whereby the intermediate members are clamped between said races and said surfaces.

10. A self-adjusting gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with one or more surfaces associated with the third of the three said bodies, so as to rotate about their axes against the said third body; the axis of rotation of the intermediate members intersecting the axis of the said co-axial races, and upon variation of the gear ratio being subjected to displacements relative to the three said races; means producing an axial force on a selected one of the said three bodies, whereby the intermediate members are clamped between said races and said surfaces, variation of the gear ratio being accomplished by axially displacing the three said bodies relative to each other; and means responsive to rotational speed disposed between selected ones of the three said bodies, the said first-mentioned means and the said means responsive to rotational speed tending to move the three said bodies relative to each other to produce a gear ratio highly suited for the momentary load demand on the transmission.

11. A variable gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with one or more surfaces associated with the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races; and torque-responsive means producing an axial force on a selected one of the said three bodies, whereby the intermediate members are clamped between said races and said surfaces; said torque-responsive means containing two or more cooperating races, round bodies therebetween, a cage housing said bodies of rotation, each said round body near its axis of rotation bearing in a cooperating cavity of the cage, the shapes of the said cooperating races and of the bodies of rotation being so determined that rotation of one race relative to the other race of the torque-responsive means is accompanied by a relative displacement of the races perpendicular to the plane of rotation.

12. A self-adjusting speed gear transmission comprising a driving shaft, a body associated with this shaft, a secondary shaft, a body associated with said secondary shaft, a reaction body, two of said three bodies having facing co-axial races; a plurality of round intermediate members all in rolling contact with said races and cooperating each with one or more surfaces associated with the third of the three said bodies, so as to rotate about their axes against the said third body; the axis of rotation of the intermediate members intersecting the axis of the said co-axial races, and upon variation of the gear ratio being subjected to displacements relative to the three said bodies in planes passing through the axis of the said co-axial races; and means producing an axial force on a selected one of the said three bodies, whereby the intermediate members are clamped between said races and said surfaces, variation of the gear ratio being accomplished by axially displacing the three said bodies relative to each other, the number, size and weight of said intermediate members being such that upon rotation of the speed gear, the intermediate members under centrifugal action tend to move the three said bodies relative to each other to produce a gear ratio adapted to the particular rotational speed and load demand.

13. A self-adjusting speed gear transmission comprising a driving shaft, a body associated with this shaft, a secondary shaft, a reaction body, two of said bodies having facing co-axial races; a plurality of round intermediate members all in rolling contact with said races and cooperating with one or more surfaces associated with the third of the three said bodies; torque-responsive means and means responsive to rotation speed producing an axial force on a selected one of the said three bodies, whereby the intermediate members are clamped between said races and said surfaces, the gear ratio being adjusted by relative axial displacements of the three said bodies under the influence of opposed actions resulting from the said torque-responsive means and from the said means responsive to rotational speed, the said actions tending to counterbalance each other resulting in a gear ratio highly suited for the momentary load demand on the transmission.

14. A self-adjusting speed gear transmission comprising a driving shaft, a body associated with this shaft, a secondary shaft, a reaction body, two of said bodies having facing co-axial races; a plurality of round intermediate members all in rolling contact with said races and cooperating with one or more surfaces associated with the third of the three said bodies; torque-responsive means and means responsive to centrifugal force producing an axial force on a selected one of the said three bodies, whereby the intermediate members are clamped between said races and said surfaces, the gear ratio being adjusted by relative axial displacements of the three said bodies under the influence of opposed forces resulting from the said torque-responsive means and from the said means responsive to centrifugal force, the said actions tending to counterbalance each other resulting in a gear ratio highly suited for the momentary load demand on the transmission.

15. A self-adjusting speed gear transmission comprising a driving shaft, a body associated with this shaft, a secondary shaft, a reaction body, two of said bodies having facing co-axial races; a plurality of round intermediate members all in rolling contact with said races and cooperating with one or more surfaces associated with the third of the three said bodies; torque-responsive means and centrifugal forces producing axial forces on a selected one of the said three bodies, whereby the intermediate members are clamped between said races and said surfaces, the gear ratio being adjusted by relative axial displacements of the three said bodies under the influence of opposed actions resulting from the said torque-responsive means and from the centrifugal forces on the said intermediate members, the said actions tending to counterbalance each other resulting in a gear ratio highly suited for the momentary load demand on the transmission.

16. A self-adjusting speed gear transmission comprising a driving shaft, a body associated with this shaft, a secondary shaft, a reaction body, two of said bodies having facing co-axial races; a plurality of round intermediate members all in rolling contact with said races and cooperating with one or more surfaces associated with the third of the three said bodies; the said races and surfaces of the three said bodies converging in the direction of revolution, means responsive to rotational speed; and means producing an axial force on a selected one of the said three bodies, whereby the intermediate members are clamped between said races and said surfaces, the gear ratio being adjusted by relative axial displacements of the three said bodies under the influence of opposed actions resulting from an axial force due to the said converging position of the said races and surfaces and from the said means responsive to rotational speed, the said actions tending to counterbalance each other resulting in a gear ratio highly suited for the momentary load demand on the transmission.

17. A self-adjusting speed gear transmission comprising a driving shaft, a body associated with this shaft, a secondary shaft, a reaction body, two of said bodies having facing co-axial races; a plurality of round intermediate members all in rolling contact with said races and cooperating with one or more surfaces associated with the third of the three said bodies; the said races and surfaces of the three said bodies converging in the direction of revolution; and means producing an axial force on a selected one of the said three bodies, whereby the intermediate members are clamped between said races and said surfaces, the gear ratio being adjusted by relative axial displacements of the three said bodies under the influence of opposed actions resulting from an axial force due to the said converging position of the said races and surfaces and from the centrifugal action on the said intermediate members, the said actions tending to counterbalance each other, resulting in a gear ratio highly suited for the momentary load demand on the transmission.

18. A self-adjusting speed gear transmission comprising a driving shaft, a body associated with this shaft, a secondary shaft, a reaction body, two of said bodies having facing co-axial races; a plurality of round intermediate members all in rolling contact with said races and cooperating with one or more surfaces associated with the third of the three said bodies; means responsive to rotational speed; means producing an axial force on a selected one of the said three bodies, whereby the intermediate members are clamped between said races and said surfaces; the gear ratio being adjusted by relative axial displacements of the three said bodies, spring means initially bearing on a selected one of said three bodies so as to force those bodies out of their position corresponding to their 1:1 gear ratio when the transmission is idling or at rest, the influence of the means responsive to rotational speed overcoming the spring-action when the said rotational speed is sufficient.

CORNELIS ANDRIES HEERO MULDER.